United States Patent
Jansson et al.

(10) Patent No.: US 7,561,901 B2
(45) Date of Patent: Jul. 14, 2009

(54) ADAPTATION OF PUSH MAIL FILTERS TO SAVE UE BATTERY POWER

(75) Inventors: Michael Jansson, Stockholm (SE); Ignacio Mas Ivars, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 606 days.

(21) Appl. No.: 11/433,772

(22) Filed: May 15, 2006

(65) Prior Publication Data

US 2007/0264948 A1 Nov. 15, 2007

(51) Int. Cl.
*H01Q 11/12* (2006.01)
(52) U.S. Cl. .................... 455/574; 455/343.2
(58) Field of Classification Search ............ 455/573, 455/574, 575.1, 127.1, 127.5, 343.1, 343.2; 370/310, 311, 329, 349
See application file for complete search history.

(56) References Cited

U.S. PATENT DOCUMENTS

| | | | |
|---|---|---|---|
| 6,781,972 B1 * | 8/2004 | Anderlind et al. | 370/329 |
| 2005/0186977 A1 * | 8/2005 | Chiu et al. | 455/466 |
| 2006/0053203 A1 * | 3/2006 | Mijatovic | 709/206 |
| 2008/0045277 A1 * | 2/2008 | Plestid et al. | 455/574 |

OTHER PUBLICATIONS

T. Showalter, "Sieve: A Mail Filtering Language", Network Working Group, http://www.ietf.org/rfc/rfc3028.txt?number-3028, Jan. 2001, pp. 1-34.*

* cited by examiner

*Primary Examiner*—Thanh C Le
(74) *Attorney, Agent, or Firm*—Nixon & Vanderhye P.C.

(57) ABSTRACT

One or more push mail filters of an email dispatcher is automatically, and preferably in an event-driven and dynamic manner, adapted to decrease the number of messages transmitted to a battery-operated user equipment (UE) based on one or more battery conservation parameters monitored by or for the UE.

25 Claims, 4 Drawing Sheets

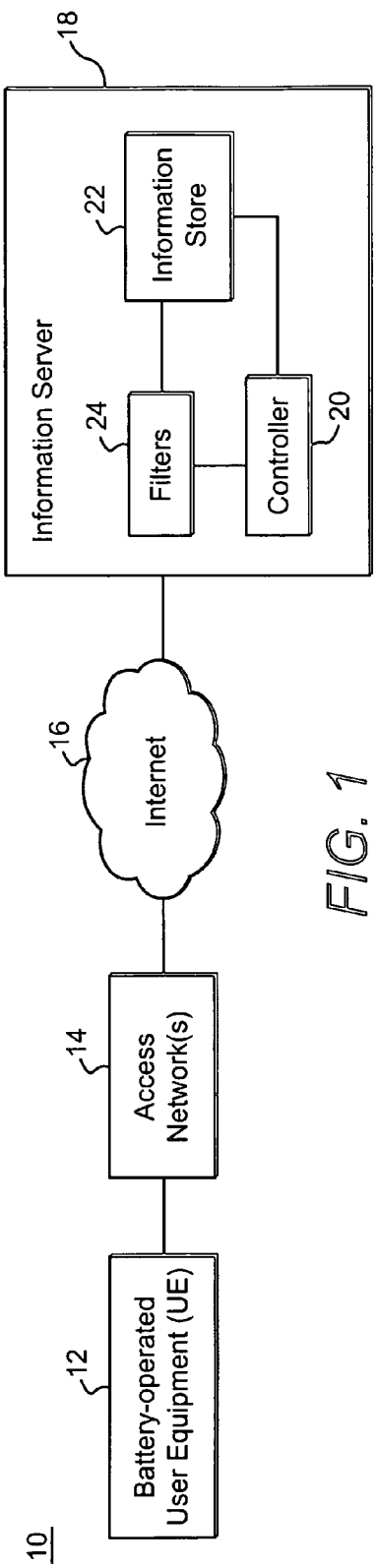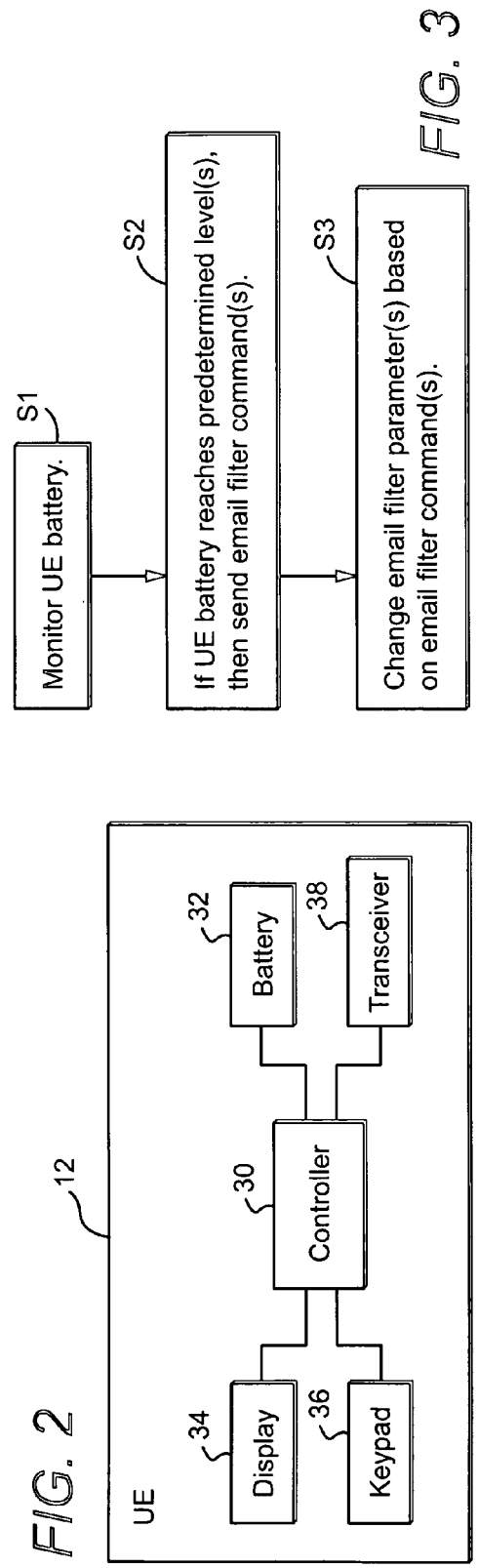

ADAPTATION OF PUSH MAIL FILTERS TO SAVE UE BATTERY POWER

TECHNICAL FIELD

The technical field relates to communications, and more particularly, to controlling the flow of data to a battery-operated communications device from a data source.

BACKGROUND

As the popularity of the Internet and wireless communications continues to grow, an increasing number of people are accessing the Internet and communicating with wireless user equipments (UEs). These UEs include (but are not limited to) cell phones, personal digital assistants (PDAs), handheld computers, laptop computers, Blackberries, and other types of portable or mobile computing systems. UEs may be used to retrieve electronic mail (email) messages, stock quotes, sporting event scores, weather forecasts, and various other information available from numerous web sites and their associated web pages.

E-mail messages are generally sent to an e-mail server that stores received messages in the recipient's e-mail mailbox. The user later retrieves these messages with either a web browser or an e-mail client that uses one of a number of e-mail retrieval protocols. While some clients and servers may use vendor-specific, proprietary protocols, most support the Internet standard protocols, i.e., SMTP for sending e-mail and Internet Message Access Protocol (IMAP) or Post Office Protocol (POP) for retrieving e-mail, allowing interoperability with other servers and clients. The current version of IMAP, version 4 revision 1 (IMAP4rev1), is defined by RFC 3501. There are a number of existing "push mail" products commercially available where an email server automatically notifies a UE when a new email addressed to the user of that UE is received at the email server. That email notification is sometimes called "push mail" because the email server automatically sends the email notification to the UE without the UE first requesting it.

Today's push mail applications unfortunately create a serious drain on the UE battery. Every time a new mail notification is sent to the UE, the UE leaves a very low power conservation state and enters into a higher power consuming state for a certain amount of time. One a higher power consuming state is entered, there is also often a fixed time period during which the UE must remain in that state before returning to a low power conservation state. Given the volume of email received by the average UE user, this battery drain is a significant problem.

Frequent email notifications can be particularly problematic when the UE battery is at a low level. Further drain on low charge level batteries resulting from continuing push mail notifications can result in disabling the UE so that other functions (receiving or transmitting a call, using data processing UE functions, etc.) can not be used. If the battery runs out because of frequent pushed mails, the user may be interrupted right in the middle of a document, message formulation, or some other task, and that work may be lost.

What is needed is a way for a UE to automatically control the volume and type of email (and any other pushed data) that is communicated to the UE based on the battery power level of the UE.

SUMMARY

The technology described below solves the above identified problems. In a preferred but non-limiting example application of the technology, one or more push mail filters of an email dispatcher is(are) automatically, and preferably in an event-driven and dynamic manner, adapted to decrease the number of messages transmitted to a UE based on one or more battery conservation parameters monitored for or by the UE.

More generally, the technology conserves power in a user equipment that operates using a battery and receives information from an information server intended for a user of the user equipment or the user equipment. A battery parameter of the battery (e.g., battery charge level) is monitored to determine if the battery parameter meets a predetermined value (e.g., determining if the current battery level is at or below a predetermined battery level). Based on the determination that the battery parameter meets the predetermined value, a command is generated requesting creation or adjustment of an information filter in the information server. The information filter is associated with the user or the user equipment. The command is provided to the information server to effect the information filter creation or adaptation. For example, the command may be to adjust the information filter to reduce an amount or frequency of information sent from the information server to the user equipment.

In one example application, the information server is a push mail server and the filter is an email notification filter. The command in that context might be to adjust the email notification filter to reduce the frequency of notification that the push mail server has information for the user or the user equipment. One example push mail server is a Push-Internet Message Access Protocol (P-IMAP) server. Moreover, the command may be formatted, for example, in accordance with a Sieve mail filtering language. Sieve is a language that can be used to create filters for electronic mail. Although it is a specialized filtering syntax/language, Sieve is not tied to any particular operating system or mail architecture. Details regarding Sieve are available in the Internet standards document RFC 3028.

The command may also include a request to filter the information sent from the information server to the user equipment based one or more of the following: a user preference, a user location, a source or association of the information, an event, a time, a time period, size of the information for the user or user device, type of information for the user of user device. The technology can be implemented in the user equipment or in a node other than the user equipment.

The information server cooperates to conserve power in battery-operated user equipments (UEs). The information server includes memory for storing information intended for a user of the user equipment or the user equipment. When a command generated in response to a determination that a battery parameter of the UE battery meets a predetermined value is received, a filter associated with the user or the user equipment in the information server is either created or adjusted based on the determination that the battery parameter meets that predetermined value. Delivery of the information intended for the user or the user equipment is controlled based on the created or adjusted filter.

The filter can be, for example, an email notification filter created or adjusted to reduce a frequency of notification that email for the user or the user equipment is ready for transfer to the user equipment. The information server in one non-limiting example may be a Push-Internet Message Access Protocol (P-IMAP) server, and the command can be formatted in accordance with the Sieve mail filtering language.

BRIEF DESCRIPTION OF THE DRAWINGS

FIG. 1 is a function block diagram illustrating an example environment in which the technology described herein may be implemented;

FIG. 2 is a function block diagram of an example UE;

FIG. 3 is a flow chart diagram illustrating example procedures for regulating pushed information based on UE battery level;

DETAILED DESCRIPTION

Figure 4:
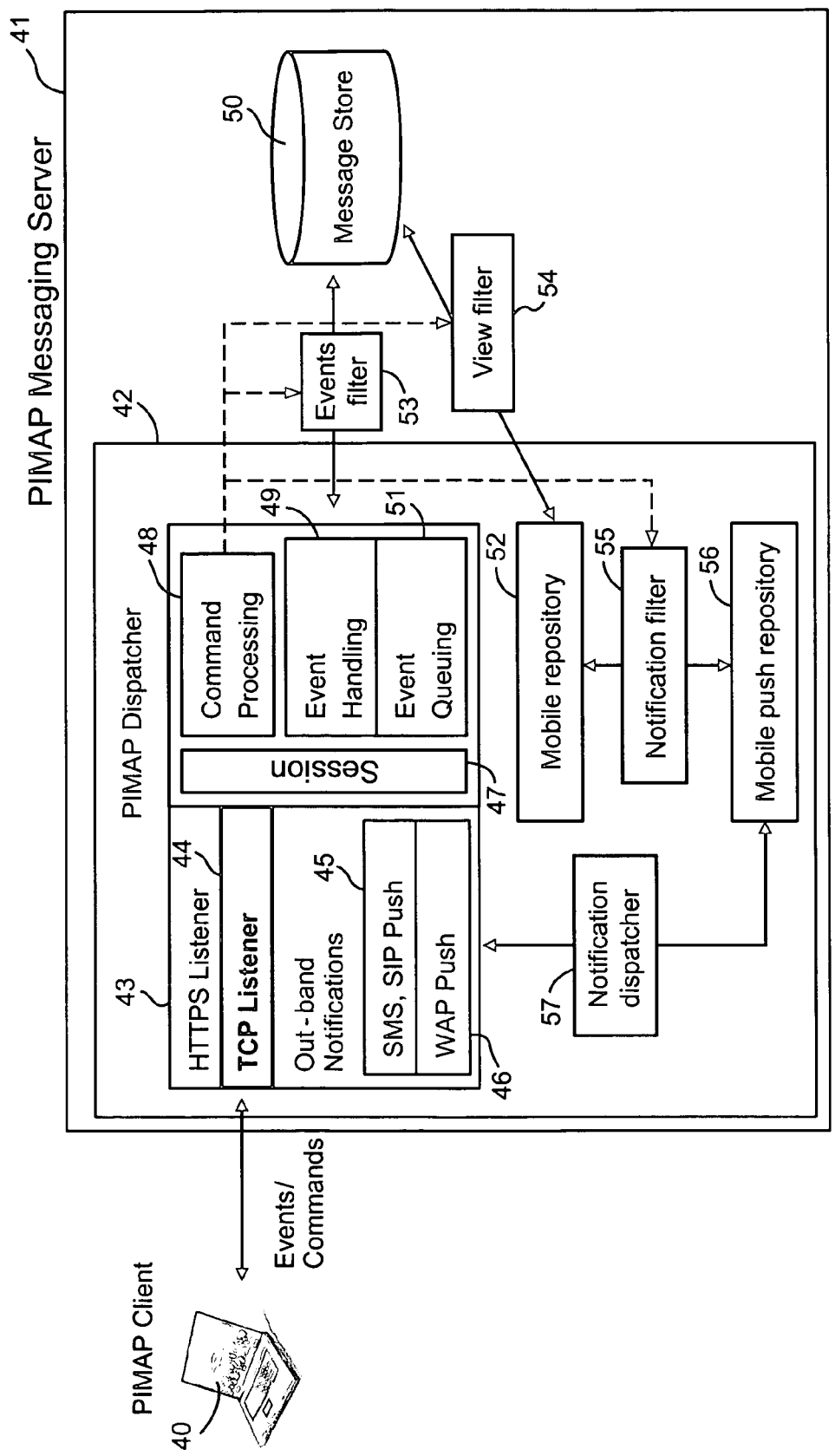
FIG. 4 is a function block diagram of another example environment in which the technology described herein may be implemented.

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), field programmable gate arrays, one or more digital signal processors (DSPs), etc.

Particular examples are described with reference to user equipment (UE). But the technology described may be applied to any type of device that can communicate with another device via a communication link. Non-limiting UE examples include cell phones, personal digital assistants (PDAs), handheld computers, laptop computers, vehicle-based computer systems, pagers, communicators, and the like. Further, various examples described below refer to the communication of electronic mail (email) information to a UE. But the technology can be applied to any type of information including but not limited to sports scores, instant messages, weather forecasts, movie listings, stock quotes, etc.

FIG. 1 is a function block diagram that illustrates an example application 10 in which the technology may be implemented. A battery-operated user equipment 12 is coupled to an information server 18 via one or more access network(s) 14 and the Internet 16. In the example where the UE is a cell phone, the access networks may include a radio access network and one or more core networks. The information server 18 may contain an information store 22 and one or more information filters 24 coupled to a controller 20. But information store 22 is just an example, and information may be stored in multiple local or in one or more external memories. The information server 102 receives information from multiple sources and distributes that information to the UE(s).

As one non-limiting example, email messages may be received via the Internet or via an intranet from multiple users and other sources. Users access the information server functioning in this example as an email server using an email application program, a web browser, or other application program. Received email messages are stored for retrieval by the UE recipient(s) of the email messages. The UE may communicate with the email information server 18 using Internet Message Access Protocol (IMAP). IMAP is a protocol that allows mail clients running on the UE to interact with email servers and manipulate mailboxes (or inboxes) on the email servers. IMAP includes operations for creating and deleting messages as well as checking for new email messages, etc.

FIG. 2 illustrates in function block from the UE 12. The UE 12 preferably includes a display 34, a keyboard or keypad 36, and perhaps one or more auxiliary user interfaces not shown, each of which are coupled to a controller 30. The controller 30 is also coupled to transceiver circuitry 38, which if the UE is a wireless UE, includes radio frequency (RF) transceiver circuitry including an antenna (not shown). The controller includes data processing circuitry and memory for storing various programs including an operating system and applications programs. Examples of application programs include a web browser and an email program. Battery 32 provides electrical power to electrical circuitry in the UE 12 and may also be coupled to a regulator (not shown) which regulates power to the UE. The controller 30 typically operates the UE in a low-power mode to conserve the battery until the UE needs to receive signals or information.

An advantageous feature of the technology in this application is conserving the battery power in the UE with respect to receiving information from the information server 18. Referring to the flowchart in FIG. 3, the battery level of the UE is monitored (step S1), and if the UE battery reaches a predetermined level (there can be more than one level), one or more information filter commands is(are) sent to the information server 18 (step S2). The command(s) direct(s) the information server to either (1) create an information filter associated with this UE or the UE user, or (2) adapt one or more such existing filters in the information server based on the battery reaching the predetermined level (step S3). The created or adapted filter(s) then reduce(s) in some way the information amount or frequency directed to the UE, thereby conserving the UE's remaining battery power.

The technology has wide application to any type of information service, but is particularly useful when the service "pushes" information to the UE—a push service. One non-limiting example of a push information service is push email or simply push mail. In push mail, the UE is notified by the push mail server whenever it has a new email message for the UE or the UE user. Based on the battery level of the UE, the UE can dynamically adapt one or more push mail filters of the push mail server in order to change how those emails are handled with respect to the UE. Other non-limiting examples of push services include WAP push and instant messages like SIP messages that use the push access protocol PAP and push services that do not use PAP.

FIG. 4 illustrates a non-limiting example push mail application. The example push mail protocol is IMAP, and the push mail server is a P-IMAP messaging server 41 that receives events and commands from a P-IMAP client 40 corresponding to a UE. The P-IMAP messaging server 41 has a P-IMAP dispatcher 42 that includes a HTTP Listener 43 functionality that listens to commands sent from the P-IMAP client over a normal HTTP, a secure HTTPS connection, and/or a TCP listener. A TCP Listener 44 listens for the events or commands sent over a pure TCP connection. The TCP and the HTTP listeners 43 and 44 are two non-limiting options for communicating with the P-IMAP server 41. One or both can be used, and both can use the -S variants (i.e., TCP/TLS or HTTPS) to encrypt the communication. An out-band notifications functionality like SMS, SIP, and WAP Push entities 45 and 46 provides transport mechanisms to convey notifications from the P-IMAP server to the UE to trigger certain events in the UE, like opening a connection to retrieve a new mail. A session controller 47 maintains the session state information between the UE and the P-IMAP server 41. An event handling entity 49 responds to events occurring in the message store 50, like the arrival of a new mail, and filters those events to obtain the ones that have to be notified to the UE. An event queuing entity 51 buffers events to be notified to the UE using the out-band notification mechanisms.

The P-IMAP dispatcher 46 also includes a command processor 48 for processing commands received for the UE from the TCP listener 44. The command processor 48 creates and adapts one or more filters associated with the UE or the UE user in response to the commands. In a non-limiting embodiment, the events or commands to change a filter parameter can be communicated using a mail filtering language like Sieve, which is described in RFC 3028. As an example, each UE may have an events filter 53, a view filter 54, and a notification filter 55. If a UE-addressed email stored in the mass message store 50 passes the view filter 54 (the view filter controls which mails in the message store will be seen by the mobile client), which is often default set to pass all the UE's emails, that email is stored in the mobile repository 52 where the emails are stored for this specific UE in anticipation of being pushed to the UE. The notification filter 55 operates on the interface between the mobile repository 52 and the mobile push repository 56 and stores those emails that will actually soon be pushed to the UE.

The event filter 53, at the interface between the P-IMAP dispatcher 46 and the message store 47, filters out message events concerning messages in the push repository 56. For example, a mail from a user's supervisor is received in the message store 50. The message store notifies the mobile repository 52 of this event since the event filter 53, in this example, dictates that all new mail events should be notified to the user. The P-IMAP dispatcher 42 matches the new mail with the view filter 54. If the mail should be seen by the UE mobile client (e.g., a mail from the user's supervisor or with the word "important" in the Subject:), the P-IMAP dispatcher 42 updates its list of mails to be synchronized in the UE client. Last, the P-IMAP dispatcher 42 checks whether this mail should be immediately pushed to the client with the notification filter 55, which again matches since the Subject line contains 'Important'. The P-IMAP dispatcher 42 then delivers an out-of-band notification to the UE client asking the UE to open a connection and retrieve the mail. The syntax for defining a view filter or notification filter includes any combination of most of the search criteria defined in the SEARCH command of IMAP.

As the commands are parsed by the command processor 48 of the P-IMAP dispatcher 42, the view filter 54, the notification filter 55, and/or the events filter 53 is/are modified to fit the new settings. For example, when a UE mobile client enters a low battery status, the user may define a profile which updates the filters as follows. The view filter 54 could be configured to pass mails that contain the word 'Important' in the subject, so that only those important mails will be synchronized when the UE mobile client opens a connection on user request. The notification filter 55 could be configured to pass mails with the word 'Urgent', so that only urgent mails cause the UE mobile client to open a connection and retrieve the mail. The events filter 53 could be similarly configured so that only mails from the supervisor are notified to the mobile repository 52.

Although only one battery trigger level may be used, multiple triggers may be set for different battery levels. For example, as the battery level reaches a first threshold, a first filter change command could be issued that might result in a slightly reduced granularity for receiving emails, (e.g., push an email notification when two emails are received rather than every time a single email is received at the IMAP server for the UE), so that there is some modest conservation of UE battery. As the battery level drops and crosses a second threshold, a second filter change command could be issued that might result in a further reduced granularity for receiving emails, (e.g., push an email notification when five emails are received rather than every time an email is received at the IMAP server for the UE), so that there is a greater conservation of UE battery, and so forth. At a certain low battery level, the filter command issued may even indicate that no further emails should be pushed to the UE until the UE's battery is recharged to a higher level.

In addition to a certain battery level indication in the UE which triggers creation or adaptation of one or more push mail filters associated with this UE, one or more other type events may also trigger sending commands for push mail filter changes. Non-limiting examples include manually-changed user preferences or user profile information for the push mail application, UE location, a source or association of the information, an event, a time, a time period, size of the information for the user or user device, type of information for the user of user device.

Figure 5:
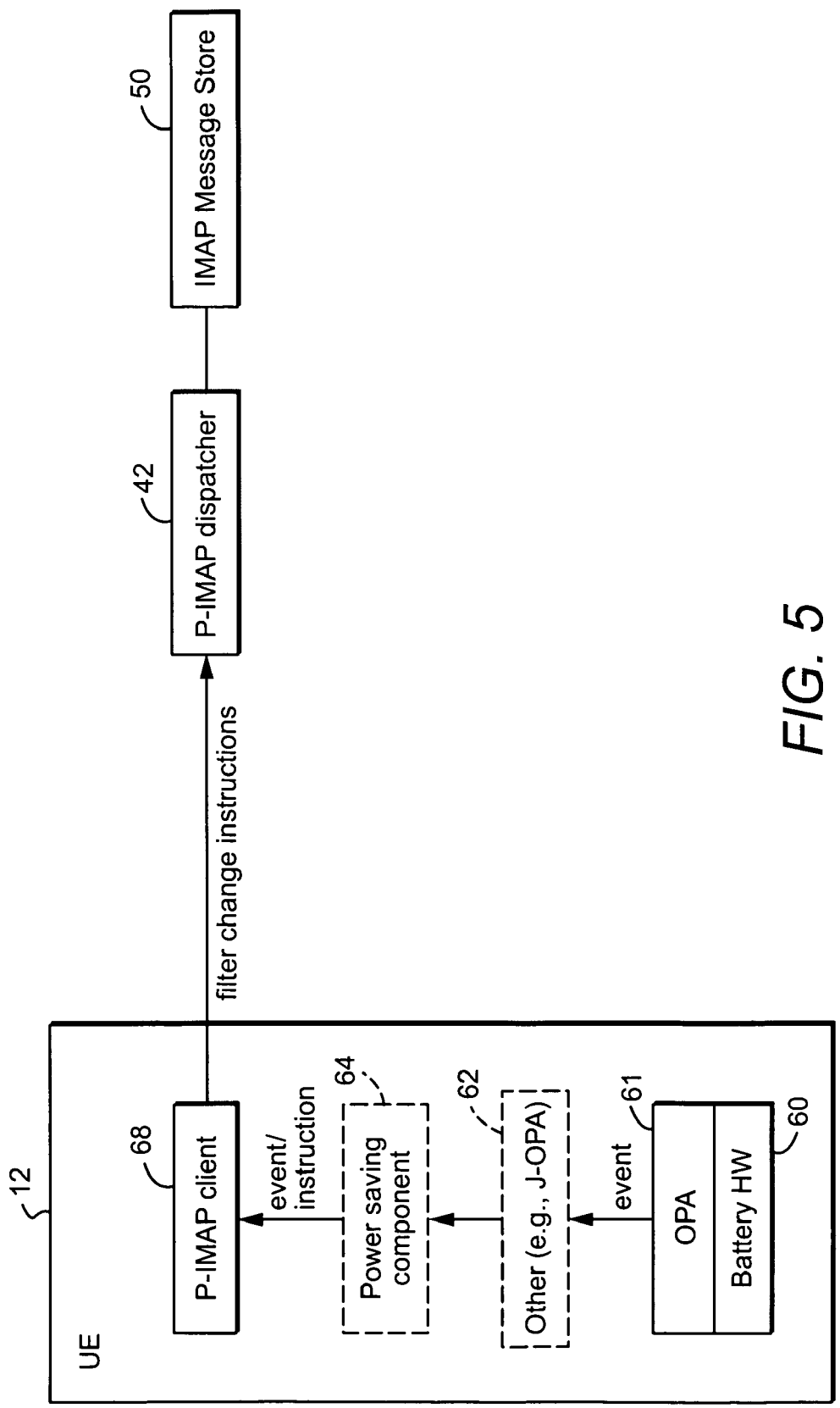
FIG. 5 is a diagram showing one non-limiting example how filter change instructions may be generated in the UE based on battery level and sent to the P-IMAP dispatcher of FIG. 3 to change push mail filtering parameter(s) for that UE.

FIG. 5 shows one example of a battery level trigger command scenario implemented in the UE 12. However, the monitoring of the UE battery level, the comparison of that level to a predetermined battery level, and the decision, formulation, and providing of the command to create or change one or more push mail filters may be performed in a node or nodes other than the UE. The battery level information monitored and compared in the battery hardware 60. When a battery level event is detected, it is sent via an open platform interface application (OPA) 61 to the P-IMAP client application 68 which generates a filter change instruction that is sent to the P-IMAP dispatcher 44. The P-IMAP dispatcher 42 modifies the notification, view, and/or event push mail filters to reduce the amount and/or frequency of mails pushed to the UE. The existing IMAP connection between the P-IMAP client and the P-IMAP dispatcher could be used to transfer filter adaptation instructions.

The battery level event may optionally be processed by a Java-OPA entity 62 and a power saving component 64, if desired, to allow reuse of standard components in a UE mobile client which control battery status and battery information available to applications. Although the push mail application may receive information regarding the UE battery status, some other UE application, such as a UE power saving entity, could receive UE battery status information generate a push mail filter change command or instruct the P-IMAP client to generate a push mail filter change command.

Figure 6A:
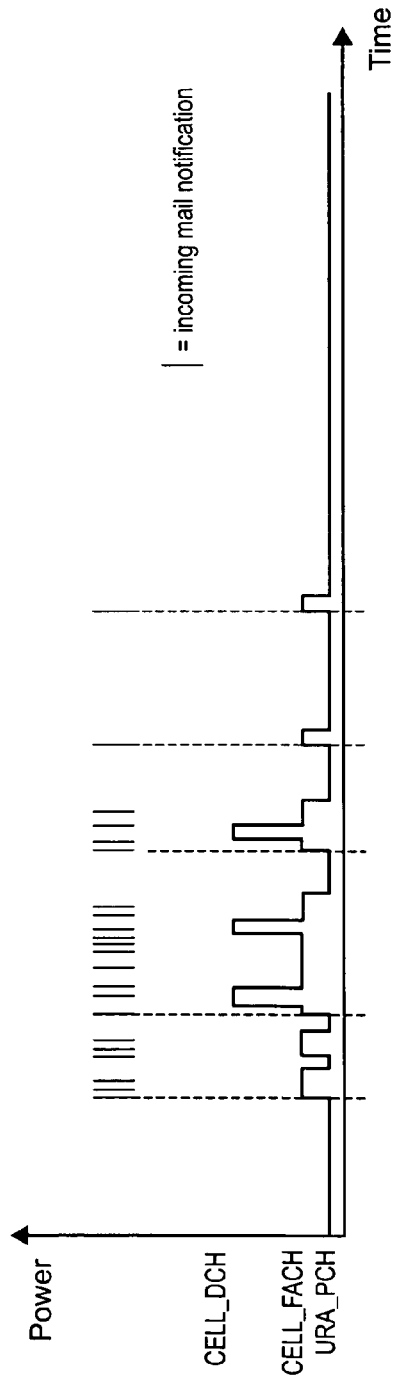
FIG. 6A is a graph illustrating UE power drain under one filtering condition.
Figure 6B:
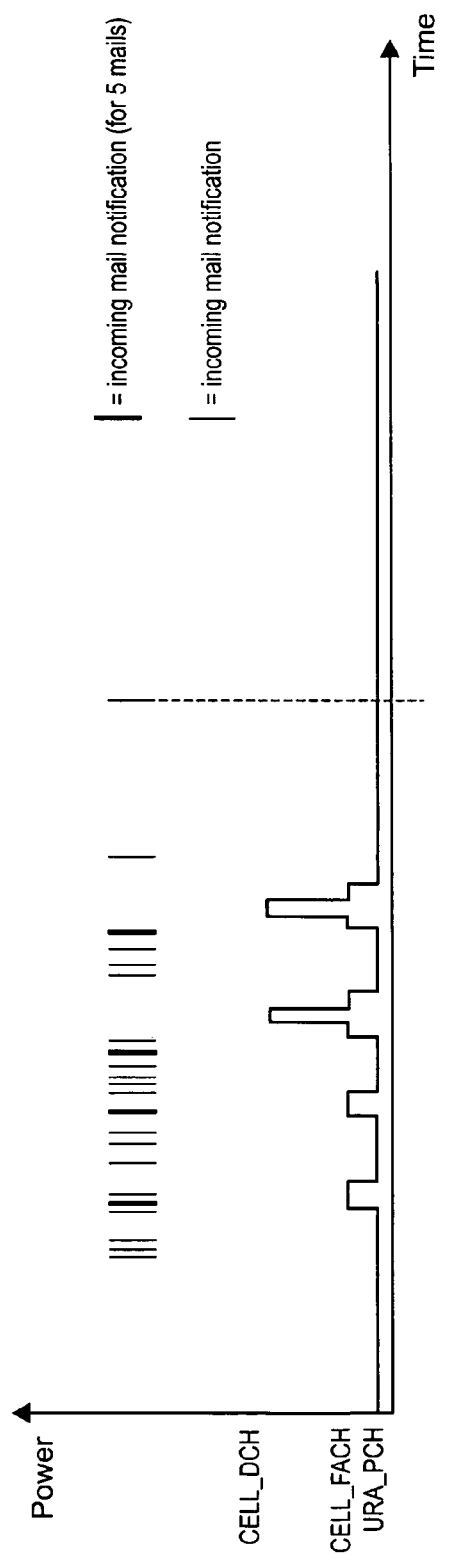
FIG. 6B is a graph illustrating UE power drain under another power conserving filtering condition.

As the battery level of the UE drops, the UE makes an attempt to lower the power consumption caused by the push mail application. This is illustrated in FIGS. 6A and 6B. Assuming a full battery level and that a user receives 22 mails on a given (work) day, those emails could be spaced out as indicated in FIG. 6A. For each new mail notification/fetch shown as a vertical line, the UE moves to a more power-consuming state. If the time from when one mail has been retrieved and the next notification arrives is longer than a state machine timer, then the UE switches down into a less power-consuming state. If a new mail notification arrives while the UE is still in a higher state, then the timer is reset.

In FIG. 6B, a push mail filter change has occurred in response to a lower battery detection in the UE so that the UE only receives an email notification when the user has five new mails to view. The UE then connects and fetches all five emails at the same time. This would mean only one timer expiration per five mails (unless overlap), resulting in a substantial savings in battery power. Other filtering options could be used to save battery including as non-limiting examples: fetching of email headers only, only part of the headers, only one or more parts of mail body, the mail body only without and attachments, filtering on headers of the mail, like From, To, Subject, and other standard headers, etc.

Accordingly, the above-described technology increases the possibilities of controlling the push mail application flow and behavior in a dynamic, event-driven manner, making it possible to lower the impact on UE battery consumption. In addition to power conservation, the technology also optionally provides for a finer granularity of user requirements using parameters in addition to battery life, such as time, location, other services running, etc.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method for conserving power in a user equipment that operates using a battery and receives information from an information server intended for a user of the user equipment or the user equipment, the method comprising:
monitoring a battery parameter of the battery;
determining if the battery parameter meets a predetermined value;
generating a command to create or adjust a filter in the information server, the filter being associated with the user or the user equipment, based on the determination that the battery parameter meets that predetermined value; and
providing the command to the information server to effect the filter creation or adaptation.

2. The method in claim 1, wherein the battery parameter is battery level and the determining step includes determining if the battery level is at or below a current battery level, and
wherein the command is to adjust the filter to reduce an amount or frequency of information sent from the information server to the user equipment.

3. The method in claim 2, wherein the information server is a push mail server and the filter is an email notification filter, and
wherein the command is to adjust the email notification filter to reduce the frequency of notification that the push mail server has information for the user or the user equipment.

4. The method in claim 3, wherein the push mail server is a Push-Internet Message Applications Protocol (P-IMAP) server and the command is formatted in accordance with the Sieve mail filtering language.

5. The method in claim 2, wherein the command includes a request to filter the information sent from the information server to the user equipment based one or more of the following: a user preference, a user location, a source or association of the information, an event, a time, a time period, size of the information for the user or user device, type of information for the user of user device.

6. The method in claim 1, wherein the command includes a request to filter the information sent to the user equipment based on information associated with one or more standard headers in the Simple Mail Transfer Protocol (SMTP) such as To:, From:, or Subject:.

7. The method in claim 1 implemented in the user equipment.

8. The method in claim 1 implemented in a node other than the user equipment.

9. A method for conserving power in a user equipment (UE) that operates using a UE battery, the method comprising:
storing information intended for a user of the user equipment or the user equipment;
receiving a command generated in response to a determination that a battery parameter of the UE battery meets a predetermined value;
in response to the command, creating or adjusting a filter in the information server, the filter being associated with the user or the user equipment, based on the determination that the battery parameter meets that predetermined value; and
controlling delivery of the information intended for the user or the user equipment based on the created or adjusted filter.

10. The method in claim 9, wherein the battery parameter is a battery level associated with the UE and the determination is that the battery level is at or below a current battery level, and
wherein the controlling includes creating or adjusting the filter to reduce an amount or frequency of information sent from the information server to the user equipment.

11. The method in claim 10, wherein the filter is an email notification filter, and
wherein controlling includes creating or adjusting the email notification filter to reduce a frequency of notification that email for the user or the user equipment is ready for transfer to the user equipment.

12. The method in claim 11, wherein email is transported in accordance with a Push-Internet Message Applications Protocol (P-IMAP) server and the command is formatted in accordance with a Sieve mail filtering language.

13. The method in claim 10, wherein the command includes a request to filter the information sent to the user equipment based one or more of the following: a user preference, a user location, a source or association of the information, an event, a time, a time period, size of the information for the user or user device, type of information for the user of user device.

14. Apparatus for conserving power in a user equipment that operates using a battery and receives information from an information server intended for a user of the user equipment or the user equipment, comprising:
a monitor for monitoring a battery parameter of the battery, and an electronic controller configured to:

determine if the battery parameter meets a predetermined value;

generate a command to create or adjust a filter in the information server, the filter being associated with the user or the user equipment, based on the determination that the battery parameter meets that predetermined value; and provide the command to the information server to effect the filter creation or adaptation.

15. The apparatus in claim 14, wherein the battery parameter is battery level and the determining step includes determining if the battery level is at or below a current battery level, and wherein the command is to adjust the filter to reduce an amount or frequency of information sent from the information server to the user equipment.

16. The apparatus in claim 15, wherein the information server is a push mail server and the filter is an email notification filter, and wherein the command is to adjust the email notification filter to reduce the frequency of notification that the push mail server has information for the user or the user equipment.

17. The apparatus in claim 16, wherein the push mail server is a Push-Internet Message Applications Protocol (P-IMAP) server and the command is the Sieve mail filtering language command.

18. The apparatus in claim 15, wherein the command includes a request to filter the information sent from the information server to the user equipment based one or more of the following: a user preference, a user location, a source or association of the information, an event, a time, a time period, size of the information for the user or user device, type of information for the user of user device.

19. The apparatus in claim 14 implemented in the user equipment.

20. The apparatus in claim 14 implemented in a node other than the user equipment.

21. An information server for conserving power in a user equipment (UE) that operates using a UE battery, comprising:

a receiver for receiving a command generated in response to a determination that a battery parameter of the UE battery meets a predetermined value; and a controller for, in response to the command, creating or adjusting a filter, the filter being associated with the user or the user equipment, based on the determination that the battery parameter meets that predetermined value, wherein the controller is configured to control delivery of the information intended for the user or the user equipment based on the created or adjusted filter.

22. The information server in claim 21, wherein the battery parameter is a battery level associated with the UE and the determination is that the battery level is at or below a current battery level, and wherein the controller is configured to create or adjust the filter to reduce an amount or frequency of information sent from the information server to the user equipment.

23. The information server in claim 22, wherein the filter is an email notification filter, and wherein controller is configured to create or adjust the email notification filter to reduce a frequency of notification that email for the user or the user equipment is ready for transfer to the user equipment.

24. The information server in claim 23, wherein information server is a Push-Internet Message Access Protocol (P-IMAP) server and the command is a Sieve mail filtering language command.

25. The information server in claim 21, wherein the command includes a request to filter the information sent to the user equipment based one or more of the following: a user preference, a user location, a source or association of the information, an event, a time, a time period, size of the information for the user or user device, type of information for the user of user device.

* * * * *